United States Patent
Kannajosyula et al.

(10) Patent No.: US 11,125,725 B2
(45) Date of Patent: Sep. 21, 2021

(54) METHODS AND DEVICES FOR INSPECTION OF PIPELINES

(71) Applicant: QUEST INTEGRATED, LLC, Kent, WA (US)

(72) Inventors: Haraprasad Kannajosyula, Seattle, WA (US); Philip Dewayne Bondurant, Covington, WA (US); Anthony Mactutis, Auburn, WA (US)

(73) Assignee: QUEST INTEGRATED, LLC, Kent, WA (US)

(*) Notice: Subject to any disclaimer, the term of this patent is extended or adjusted under 35 U.S.C. 154(b) by 344 days.

(21) Appl. No.: 16/075,525

(22) PCT Filed: Feb. 3, 2017

(86) PCT No.: PCT/US2017/016457
§ 371 (c)(1),
(2) Date: Aug. 3, 2018

(87) PCT Pub. No.: WO2017/136692
PCT Pub. Date: Aug. 10, 2017

(65) Prior Publication Data
US 2019/0049411 A1 Feb. 14, 2019

Related U.S. Application Data

(60) Provisional application No. 62/290,742, filed on Feb. 3, 2016.

(51) Int. Cl.
*G01N 29/11* (2006.01)
*G01N 29/04* (2006.01)
*G01N 29/24* (2006.01)

(52) U.S. Cl.
CPC ........... *G01N 29/11* (2013.01); *G01N 29/043* (2013.01); *G01N 29/2412* (2013.01);
(Continued)

(58) Field of Classification Search
CPC .. G01N 29/11; G01N 29/043; G01N 29/2412; G01N 29/2437;
(Continued)

(56) References Cited

U.S. PATENT DOCUMENTS

2005/0072237 A1 4/2005 Paige et al.
2006/0050092 A1 3/2006 Bondurant et al.
(Continued)

FOREIGN PATENT DOCUMENTS

| DE | 103 04 270 A1 | 8/2004 |
|----|---------------|--------|
| GB | 2471386 A | 12/2010 |
| WO | 2015200457 A1 | 12/2015 |

OTHER PUBLICATIONS

International Preliminary Report on Patentability dated Aug. 7, 2018 in corresponding International Application No. PCT/US2017/16457, filed Feb. 3, 2017, 7 pages.
(Continued)

*Primary Examiner* — Xin Y Zhong
(74) *Attorney, Agent, or Firm* — Christensen O'Connor Johnson Kindness PLLC

(57) ABSTRACT

Systems and methods for inspection of pipelines are disclosed herein. In one embodiment, an electromagnetic acoustic transducer (EMAT) transceiver (TRX) for inspecting a pipe includes a multichannel EMAT transmitter (TX) having multiple collocated transmitter coils. The EMAT TX can generate forward-propagating ultrasound waves and backward-propagating ultrasound waves. The forward-propagating ultrasound waves have higher amplitude than the backward-propagating ultrasound waves. The EMAT TRX also includes a multichannel EMAT receiver (RX) having multiple receiver coils that can receive the ultrasound waves transmitted by the EMAT TX through the pipe.

13 Claims, 14 Drawing Sheets

(52) U.S. Cl.
CPC . *G01N 29/2437* (2013.01); *G01N 2291/0234* (2013.01); *G01N 2291/0258* (2013.01); *G01N 2291/0289* (2013.01); *G01N 2291/044* (2013.01); *G01N 2291/2634* (2013.01); *G01N 2291/2636* (2013.01)

(58) Field of Classification Search
CPC ... G01N 2291/0289; G01N 2291/0234; G01N 2291/044; G01N 2291/0258; G01N 2291/2634; G01N 2291/2636
See application file for complete search history.

(56) References Cited

U.S. PATENT DOCUMENTS

| | | | |
|---|---|---|---|
| 2008/0289424 A1 | 11/2008 | Venczel | |
| 2009/0150094 A1* | 6/2009 | Van Velsor | G01N 29/2462 702/39 |
| 2009/0193899 A1 | 8/2009 | Panetta et al. | |
| 2010/0049452 A1 | 2/2010 | Suginouchi et al. | |
| 2010/0199767 A1 | 8/2010 | Ganin | |
| 2011/0181275 A1* | 7/2011 | Hoyt | G01N 27/82 324/220 |

OTHER PUBLICATIONS

Examination Search Report, dated May 7, 2020, issued in corresponding Canadian application No. 3,013,160, filed Feb. 3, 2017, 4 pages.
Extended European Search Report dated Aug. 16, 2019, issued in corresponding European Application No. 17748251.0, filed Feb. 3, 2017, 9 pages.
First Office Action, dated May 23, 2019, issued in corresponding Canadian Application No. 3,013,160, filed Feb. 3, 2017, 4 pages.
International Search Report dated Jun. 6, 2017 in corresponding International Application No. PCT/US2017/16457, filed Feb. 3, 2017, 4 pages.
Written Opinion of the International Searching Authority dated Jun. 6, 2017 in corresponding International Application No. PCT/US2017/16457, filed Feb. 3, 2017, 5 pages.
Machine Translation of Chinese First Office Action, dated Jul. 15, 2020, issued in corresponding Chinese Application No. 201780009745.6, filed Feb. 3, 2017, 15 pages.
Communication pursuant to Article 94(3) EPC, dated Jan. 27, 2021, issued in corresponding European Application No. 17748251.0, filed Feb. 3, 2017, 7 pages.

* cited by examiner

METHODS AND DEVICES FOR INSPECTION OF PIPELINES

CROSS-REFERENCE(S) TO RELATED APPLICATION(S)

This application claims the benefit of U.S. Provisional Application No. 62/290,742, filed Feb. 3, 2016, the contents of which are incorporated herein by reference in their entirety.

BACKGROUND

Metal piping is prone to cracks. Typically, the cracks develop as relatively shallow defects caused by, for example, material fatigue. Over time, the cracks become longer and deeper, and, given enough time, will compromise the structural integrity of the pipe. Therefore, pipes are from time to time inspected to detect the presence and severity of cracks.

FIG. 1 is a schematic view of crack detection in accordance with prior art. Some conventional technologies generate ultrasonic waves by a piezoelectric transducer or an electromagnetic acoustic transducer (EMAT) into a solid material 6 (e.g., a metal plate). The piezoelectric transducer includes a vibrating crystal 2 and a couplant 4 (e.g., gel or fluid) that transfers vibrations onto the solid material 6 (e.g., a steel plate). In another conventional technology, the EMAT 15 produces vibrations in the solid material 6. The EMAT 15 includes a permanent magnet 10 coupled with a coil 12. When the alternating current (AC) flows in the coil 12, magnetic field of the permanent magnet 10 interacts with magnetic field created by the AC current in the coil 12 to generate eddy currents in the solid material 6. The energy of these eddy currents are transferred to the crystal lattice of the solid material, producing an ultrasonic wave. When the ultrasonic waves reach a crack 5, a reflected ultrasonic wave is generated. These reflected waves can be detected by a receiver that is also an EMAT. At the receiving EMAT (not shown), the interaction of the reflected ultrasonic waves with the magnetic field of the receiving EMAT induces electrical currents in the receiving EMAT coil circuit. These induced currents can be measured, and further analyzed to characterize the crack 5. FIG. 1 schematically illustrates the so-called Lorentz force type EMAT. However, the description generally applies to magnetostriction type of EMATs as well.

FIG. 2 is a partially schematic, isometric view of crack detection in pipes in accordance with prior art. Illustrated crack detection system 50 includes several EMAT transmitters 15-T interspersed with several EMAT receivers 15-R. These EMAT transmitters/receivers are distributed over the inner surface of a pipe 1. The individual EMAT transmitters 15-T generate ultrasound waves 40-F and 40-B in the material of the pipe 1, as explained with reference to FIG. 1. When the ultrasound waves encounter the crack 5, the reflected ultrasound waves are generated and detected by one or more EMAT receivers 15-R. A distance from the EMAT receiver 15-R to the crack can be calculated based on the known time difference between the time when the ultrasound waves were transmitted by an EMAT transmitter 15-T and the time when the reflected ultrasound waves were received by an EMAT receiver 15-R. However, the conventional system 50 is only suitable for pipes having relatively large diameter, because of the required distance between the transmitters and receivers makes them unsuitable for the pipes having small diameter. Furthermore, multiple EMAT transmitters 14-T will cause multiple reflected ultrasound waves that may be difficult to interpret by the EMAT receivers 14-R due to "signal congestion" at the EMAT receivers. These multiple signals arriving to the EMAT receivers may need to travel many rounds about the circular pipe to sufficiently attenuate, all the while taxing the limited bandwidth of the EMAT receiver. Accordingly, there remains a need for efficient detection of pipe cracks, especially for the pipes with relatively small diameters.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Specific details of several embodiments of representative systems and methods for detecting corrosion under insulation are described below. The systems and methods can be used for detecting and characterizing cracks (also referred to as "flaws") in, for example, piping, tanks or vessels. A person skilled in the relevant art will also understand that the technology may have additional embodiments, and that the technology may be practiced without several of the details of the embodiments described below with reference to FIGS. 3A-14.

In some embodiments, individual EMATs are clustered together into a multichannel EMAT transmitter (TX) to increase the strength of the ultrasonic waves and to impart directivity to the ultrasonic waves. For example, the AC current in the coils of individual EMATs can be phase-offset to produce stronger ultrasonic waves (also referred to as "signal") in a preferred direction, and weaker ultrasonic waves in the opposite direction. Furthermore, individual EMATs can be clustered together into a multichannel EMAT receiver (RX). Multiple individual EMATs of the EMAT RX can improve acquisition and interpretation of the received signal to better determine location and size of the crack in the pipe.

In some embodiments, "blind spots," i.e., the areas where the crack is difficult or impossible to detect are reduced due to the directivity of the emitted and received ultrasound waves. For example, the blind spots can be reduced by determining a ratio of forward- and backward-propagating ultrasonic waves as received by the multichannel EMAT RX and decomposed by a controller or a computer. In particular, in some embodiments the location and severity of the crack can be determined by decomposing the received ultrasonic waves into forward and backward waves. Furthermore, a modal noise, which is often present in the RX signal, can be reduced with the multichannel EMAT RX.

In some embodiments, the system is relatively small and advantageous for pipes having small diameter. In some embodiments, the inventive methods and systems are suitable for pipes used in the oil and gas industry. The inventive technology is applicable to Lorentz force type EMATs and to magnetostriction type of EMATs.

Figure 1:
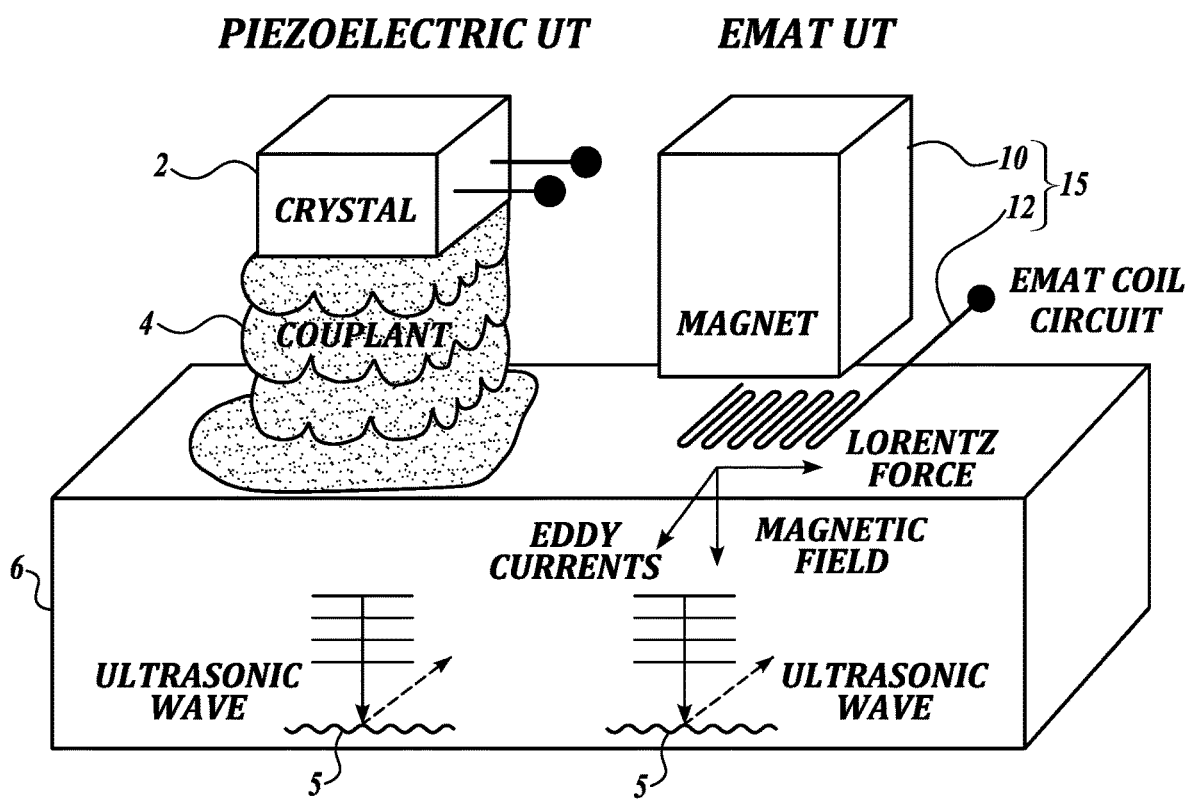
FIG. 1 is a schematic view of crack detection in accordance with prior art.
Figure 2:
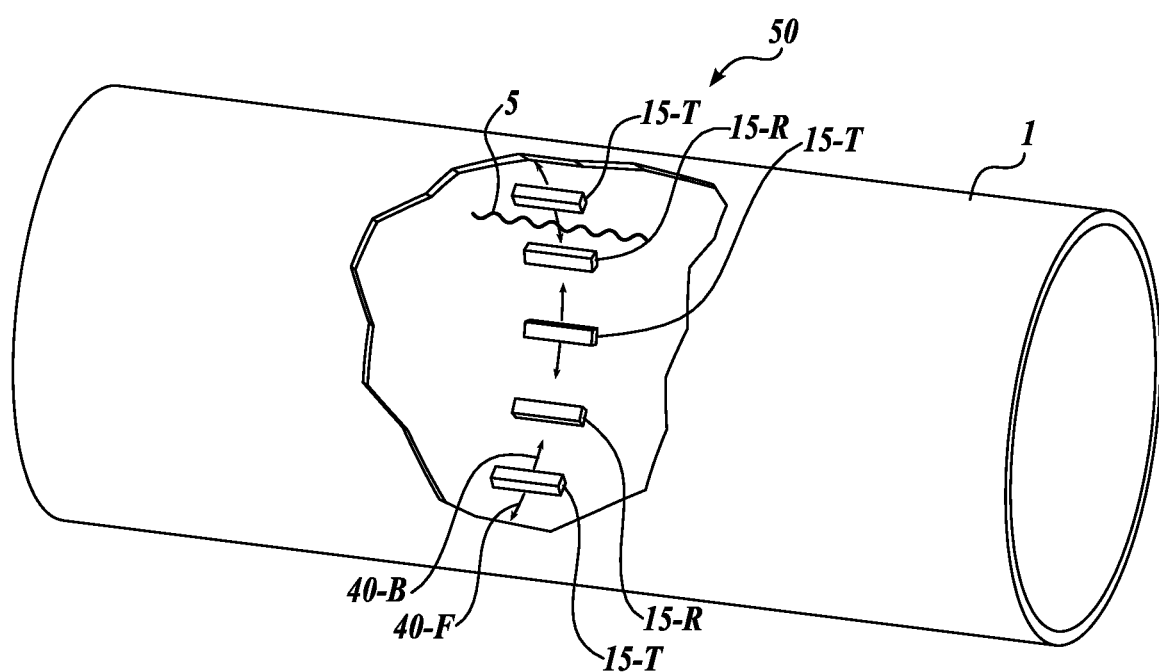
FIG. 2 is a partially schematic, isometric view of crack detection in pipes in accordance with prior art.
Figure 3A:
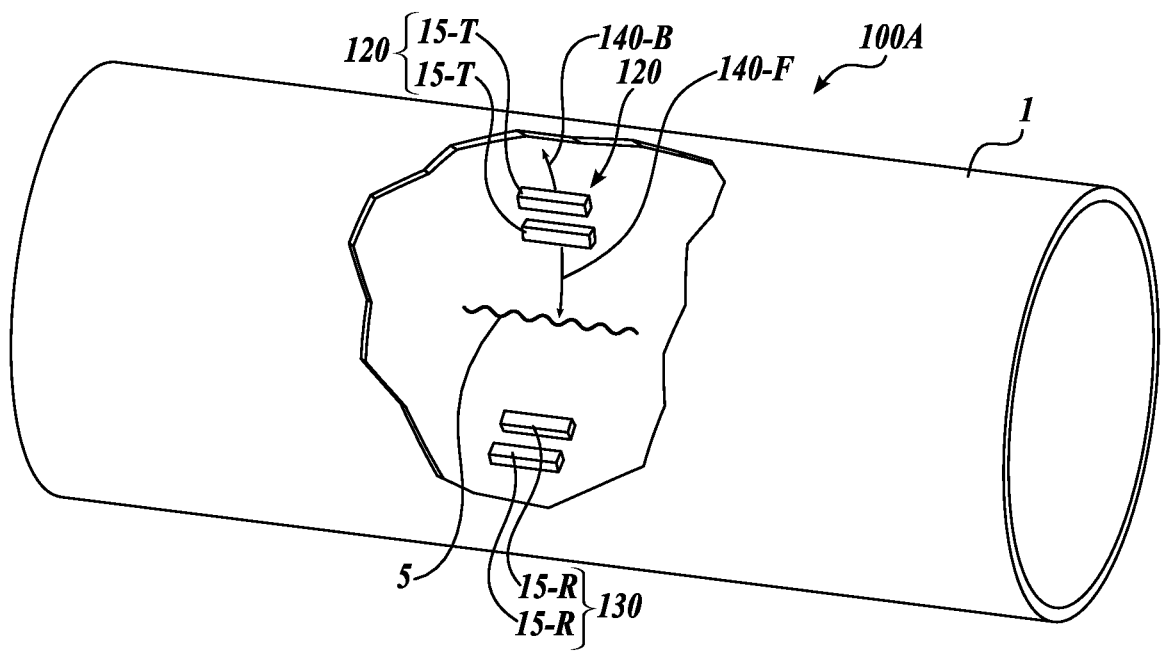
FIGS. 3A and 3B are isometric views of systems for detecting cracks in pipes in accordance with an embodiment of the presently disclosed technology.
Figure 3B:
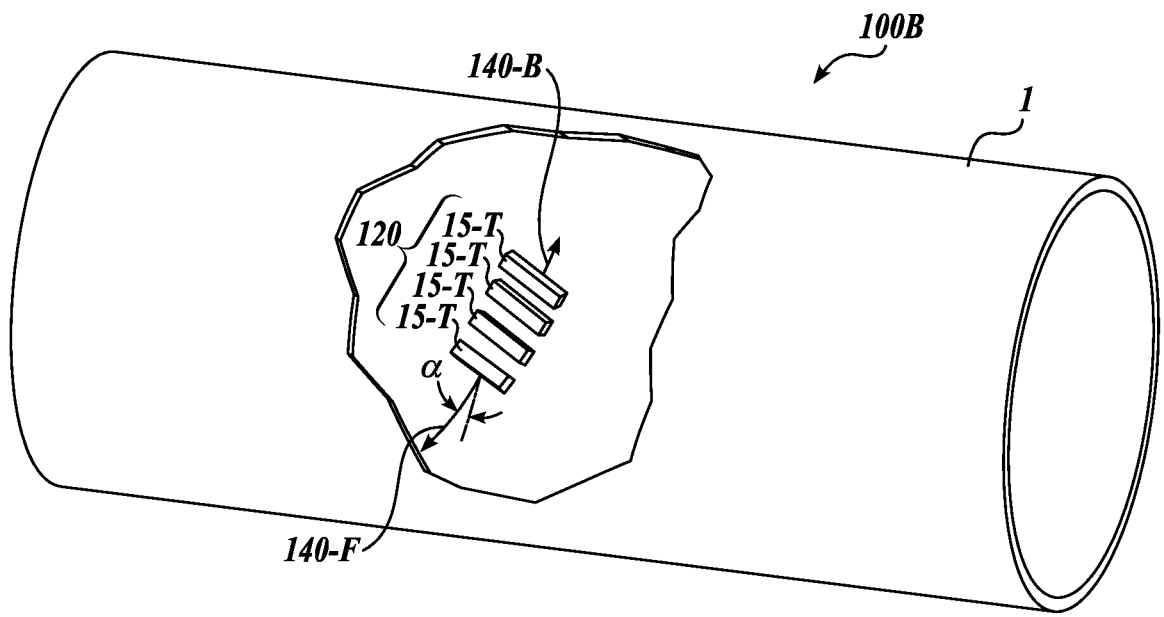

FIGS. 3A and 3B are isometric views of systems for detecting cracks in pipes in accordance with an embodiment of the presently disclosed technology. FIG. 3A shows a system 100A that includes a multichannel EMAT TX 120 having two individual EMATs 15-T. In other embodiments, the multichannel EMAT TX 120 may include different number of individual EMATs.

In some embodiments, the actuating coils of the individual EMATs 15-T generate ultrasonic waves travelling in opposite directions. For example, using appropriately time-delayed AC currents in the coils of the multichannel EMAT TX 120, the EMAT generates a relatively strong circumferential ultrasonic waves 140-F (also referred to as "forward waves" or "forward-propagating waves"), and a relatively weak circumferential waves 140-B (also referred to as "backward waves" or "backward-propagating waves") in the pipe 1. The ultrasonic waves generated by the EMATS 15-T are also referred to as the unidirectional waves because the waves predominantly propagate in one direction (e.g., in the forward direction or in the backward direction), as opposed to, for example, the ultrasonic waves propagating circularly away from the source. In some embodiments, the forward-propagating waves 140-F may have amplitude that is several times greater than that of the backward-propagating waves 140-B.

Provided that an EMAT RX 130 is not directly opposite from the EMAT TX 120 (i.e., the RX and TX are not exactly 180° apart in polar direction), the ultrasonic waves 140-F/140-B reach the EMAT RX 130 at different times. Similarly, wave reflections off the crack 5 may also reach the EMAT RX at different times. In general, when the signals that the EMAT RX senses do not overlap in time, the EMAT RX experiences smaller signal congestion. Furthermore, in at least some embodiments, when the EMAT RX 130 includes multiple individual EMATs 15-R, the EMAT RX can detect directivity of the received ultrasound signal, further improving determination of location of the crack 5.

In the illustrated embodiment, the EMATs TXs/RXs are located inside the pipe. However, in some embodiments the EMATs TXs/RXs may be located circumferentially around the pipe. Collectively, EMAT TX 120 and EMAT RX 130 may be referred to as EMAT transceiver or EMAT TRX.

FIG. 3B shows a system 100B that includes a multichannel EMAT TX 120 having four individual EMATs 15-T. In other embodiments, the multichannel EMAT TX 120 may include different number of individual EMATs. Generally, when the ultrasonic waves 140-A/140-B propagate circumferentially, they may make many circumferential rounds in the pipe before their energy dissipates. In some embodiments, these multiple rounds of the ultrasonic waves 140-A/140-B increase signal congestion at the EMAT RX. In the illustrated embodiment, the EMAT TX 120 is inclined with respect the axis of the pipe (i.e., the EMAT TX 120 is not perpendicular with respect to the axis of the pipe), therefore generating the ultrasonic waves that propagate in a spiral direction (also referred to as a "helical direction") away from the EMAT TX 120. As a result, the forward-propagating wave 140-F and the backward-propagating wave 140-B escape the area of the EMAT TX 120 after a certain number of rotations, depending on the magnitude of angle $\alpha$ and the axial width of the EMAT TX 120. In some embodiments, because the ultrasound waves 140-F/140B spirally propagate in the axial direction, a longer axial segment of the pipe can be inspected before repositioning the system 100B in the axial direction. In some embodiments, the EMAT RX 130 may be axially offset (upstream or downstream) from the EMAT TX 120.

Figure 4:
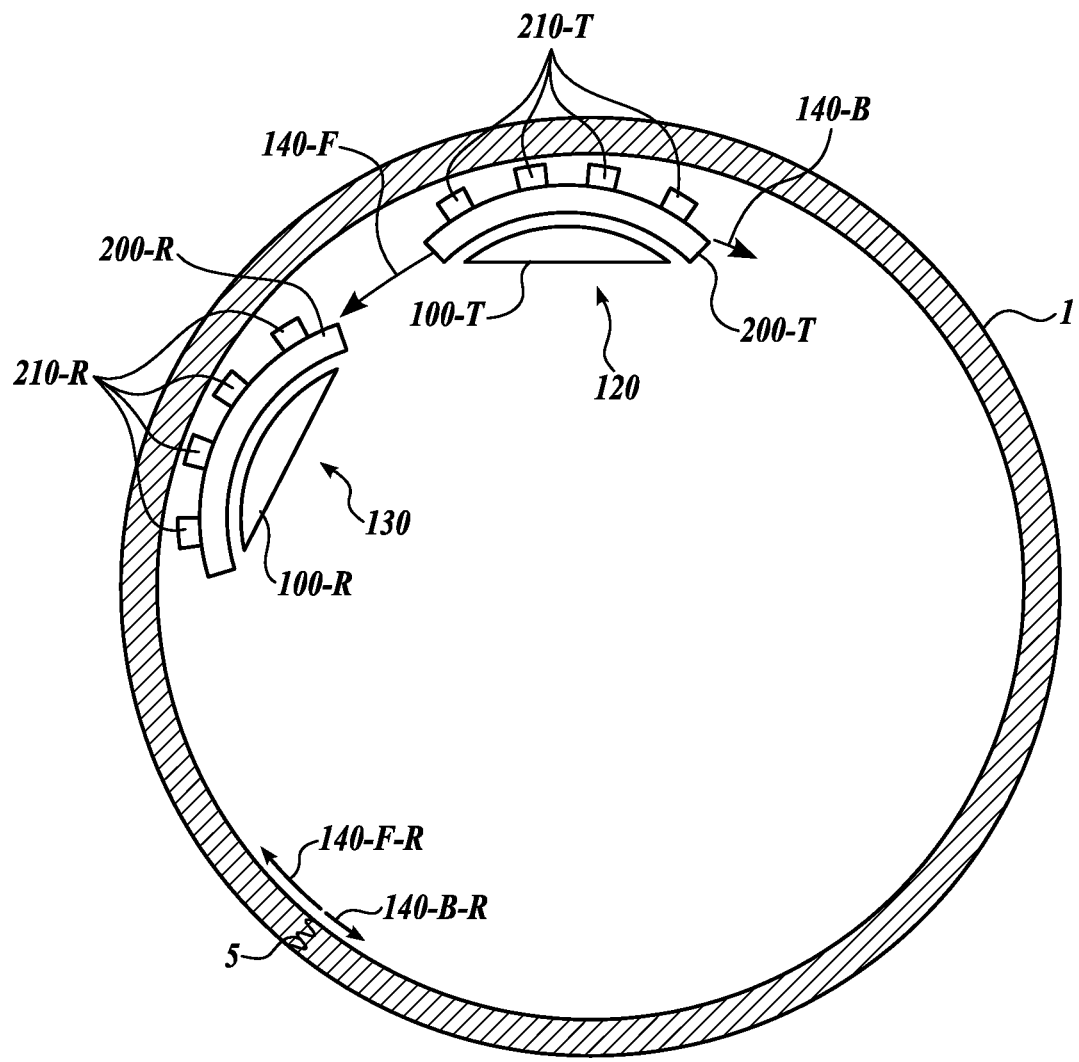
FIG. 4 is a side view of a system for detecting cracks in pipes in accordance with an embodiment of the presently disclosed technology.

FIG. 4 is a side view of a system for detecting cracks in pipes in accordance with an embodiment of the presently disclosed technology. The illustrated system includes the EMAT TX 120 and the EMAT RX 130 that are circumferentially offset. The EMAT TX 120 includes a permanent magnet 100-T and the EMAT RX 130 includes a permanent magnet 100-R. Collectively, EMAT TX 120 and EMAT RX 130 may be referred to as EMAT transceiver or EMAT TRX.

Furthermore, each of the EMAT TX 120 and EMAT RX 130 includes four coils 210-T/210-R, respectively. In other embodiments, different numbers of coils are possible. In operation, the AC currents in the coils 210-T can be phase-offset to produce a stronger ultrasound wave 140-F in one direction, and a weaker ultrasound wave 140-B in the opposite direction. Analogously, in at least some embodiments, the coils 210-R of the EMAT RX 130 will sense the incoming ultrasonic wave at slightly offset times. As a result, a direction of the detected ultrasonic wave may be determined using analog or digital signal processing. Therefore, the EMAT RX 130 can discriminate among the transmitted ultrasound waves 140-F/140-B and reflected ultrasound waves 140-F-R/140-B-R based on their differing directions, therefore enabling more precise determination of the location and/or severity of the crack 5 in comparison to the systems that can only detect the magnitude of the received ultrasound waves. In some embodiment, the signal to noise ratio (SNR) can also be improved based on using the multichannel EMAT TX and/or RX. Some suitable digital processing methods for analyzing the sensed ultrasound waves are described below with reference to FIGS. 10A-14.

Figure 5:
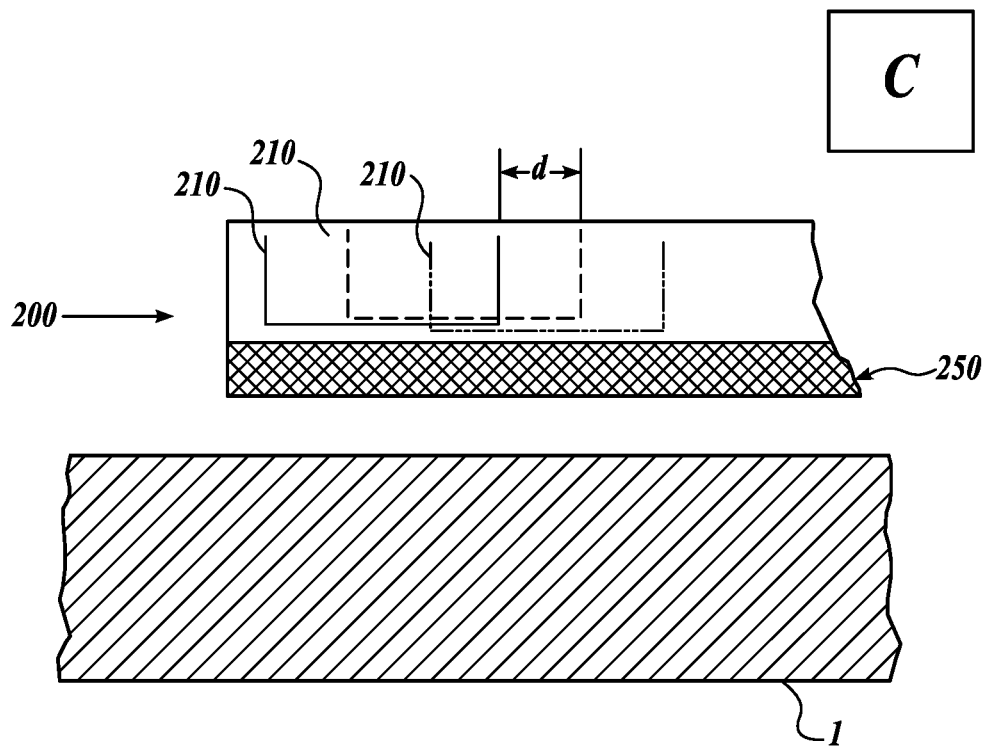
FIG. 5 is a schematic cross-sectional view of a printed circuit board in accordance with an embodiment of the presently disclosed technology.

FIG. 5 is a schematic cross-sectional view of a printed circuit board (PCB) 200 in accordance with an embodiment of the presently disclosed technology. The PCB 200 includes three collocated coils 210 that can be laid out in the routing layers of the PCB. The illustrated collocated coils 200 are mutually offset by a distance d, but their turns overlap in the illustrated side view (the insulating material of the PCB prevents electrical contact between coils 200 that are laid out in their individual routing layers). In some embodiments, the phase offset among the AC currents in the coils 200 can be selected to increase amplitude of the ultrasound waves in one direction, and to decrease their amplitude in the opposite direction. For example, the phase offset between the adjacent coils 200 may correspond to one quarter of the wavelength of the ultrasound wave ($\lambda/4$). In some embodiments, the phase offset can be controlled with a controller C (e.g., a digital microcontroller, an analog controller, a computer, etc.). Analogously, the controller C may be configured to detect the phase offset in the coils 200 of the EMAT RX. In some embodiments, the PCB 200 includes a protective material 250, for example, an electrically insulating material that prevents electrical contact between the pipe 1 and the coils 200.

Figure 6:
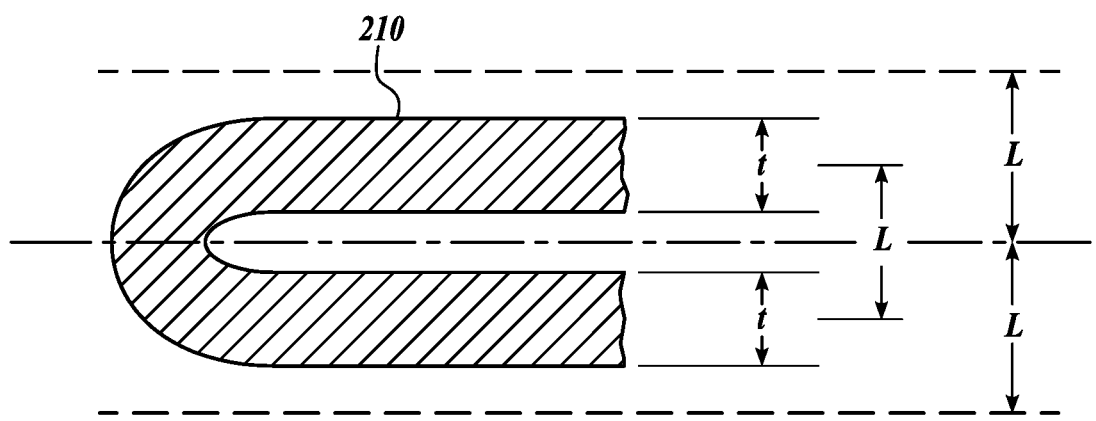
FIG. 6 is a schematic view of a width of a trace in accordance with an embodiment of the presently disclosed technology.

FIG. 6 is a schematic view of a width of a trace in accordance with an embodiment of the presently disclosed technology. The illustrated trace is a segment of the coil 210. Without being bound by theory, it is believed that wider traces reduce modal noise in the signal received by the EMAT RX. In some embodiments, a width t of the trace corresponds to more than 40% or up to 50% of the available space L (distance) between the adjacent traces.

Figure 7:
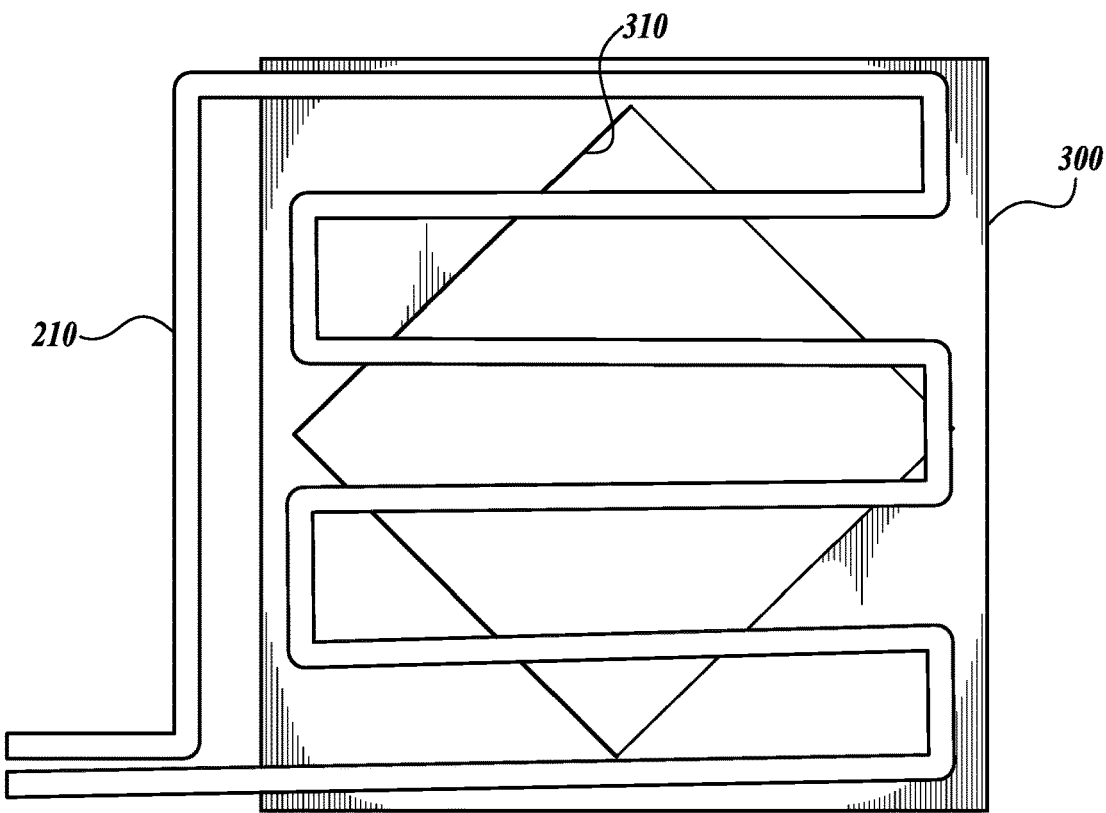
FIG. 7 is a schematic top view of a partial masking of the coil in accordance with an embodiment of the presently disclosed technology.

FIG. 7 is a schematic top view of a partial masking of the coil 210 in accordance with an embodiment of the presently disclosed technology. In the illustrated embodiment, the coil 210 is separated from the surface of the pipe by a blocking foil 300 having an opening 310 that can be elliptical, circular, rectangular, diamond shaped, etc. In some embodiments, the blocking foil 300 is a metal foil, for example a steel foil that blocks EM radiation. The opening 310 provides a path for the EM radiation to the surface of the pipe, while the material of the blocking foil 300 at least partially blocks the EM radiation to the surface of the pipe. As a result, the blocking foil 300 partially restricts eddy current in the pipe. Without being bound by theory, it is believed that the blocking foil 300 makes ultrasound waves 140-F/140-B narrower (i.e., the directivity of the ultrasound waves is better defined). Additionally, in at least some embodiments, the EMAT RX 130 is subjected to less modal noise and the sideband suppression is improved. As a result, the silent region of the signal is increased.

Figure 8:
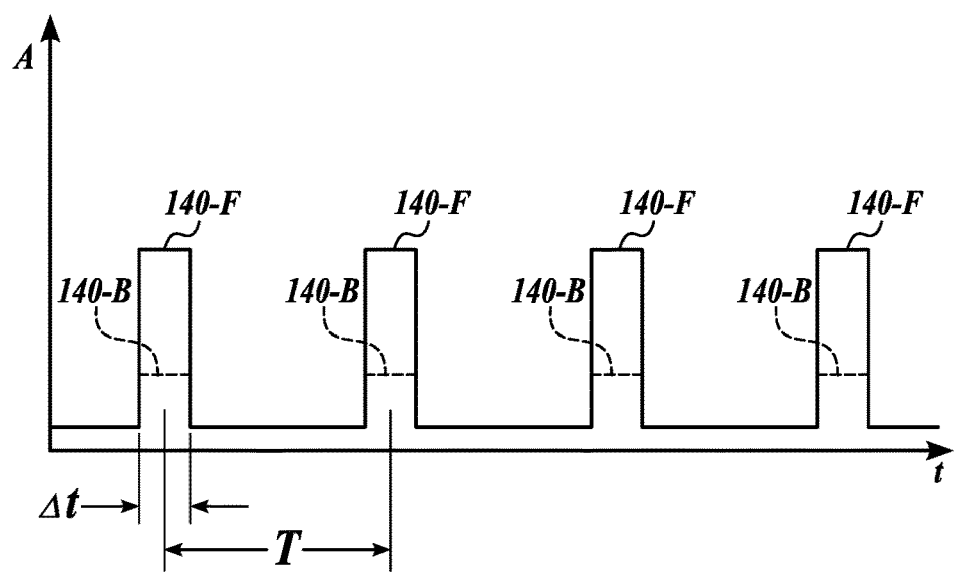
FIG. 8 is a graph of amplitudes of transmitter (TX) signal in accordance with an embodiment of the present technology.

FIG. 8 is a graph of amplitudes of transmitter (TX) signal in accordance with an embodiment of the present technology. The horizontal axis represents time, and the vertical axis represents the amplitude of the ultrasound wave ("signal"). Two signals are shown: the forward-propagating signal 140-F and the backward-propagating signal 140-B. In the illustrated embodiment, the forward-propagating signal 140-F has a larger amplitude than the backward-propagating signal 140-B. For example, the amplitude of the forward-propagating waves 140-F may have amplitude that is 4 times, 5 times, or more than 10 times greater for two channel EMAT and nearly 20 times greater for 4 channel EMAT than that of the backward-propagating waves 140-B.

The width of the amplitude is $\Delta t$, and the period of the signal is T. For a large diameter pipe and single channel EMAT an optimal $\Delta t$ can be determined to minimize the blind spots. However, in some embodiments, reducing the width $\Delta t$ can only partially minimize/eliminate blind spots because of the multimodality and dispersion of the ultrasonic waves. For example, ultrasonic waves (even when unidirectional) in thin-walled structures (such as plates and pipes) are characterized by multiple wave packets having a frequency-dependent velocity (also known as "wave dispersion"). Further, at a given frequency, these multiple wave packets (or modes) may propagate with distinct velocities (also known as "multimodality"). Furthermore, the wave dispersion and multimodality tend to be more pronounced in the pipes having smaller diameters. In some embodiments of the inventive technology, a reduction of the blind spots at the EMAT RX is achieved by (a) limiting the frequency bandwidth of the ultrasonic waves, and (b) reducing the number of modes in the waves generated at a given frequency.

Limiting the frequency bandwidth involves using sinusoidal signals with multiple cycles or a relatively large $\Delta t$. Additionally, coils 210 having a large number of turns also reduce the number of modes.

Reducing the number of modes involves using multichannel EMAT RX, without increasing the overall dimensions of the transducer module. In some embodiments, this economy in size is obtained because the multiple EMAT coils 210 can be overlaid on a printed circuit board (PCB).

Figure 9A:
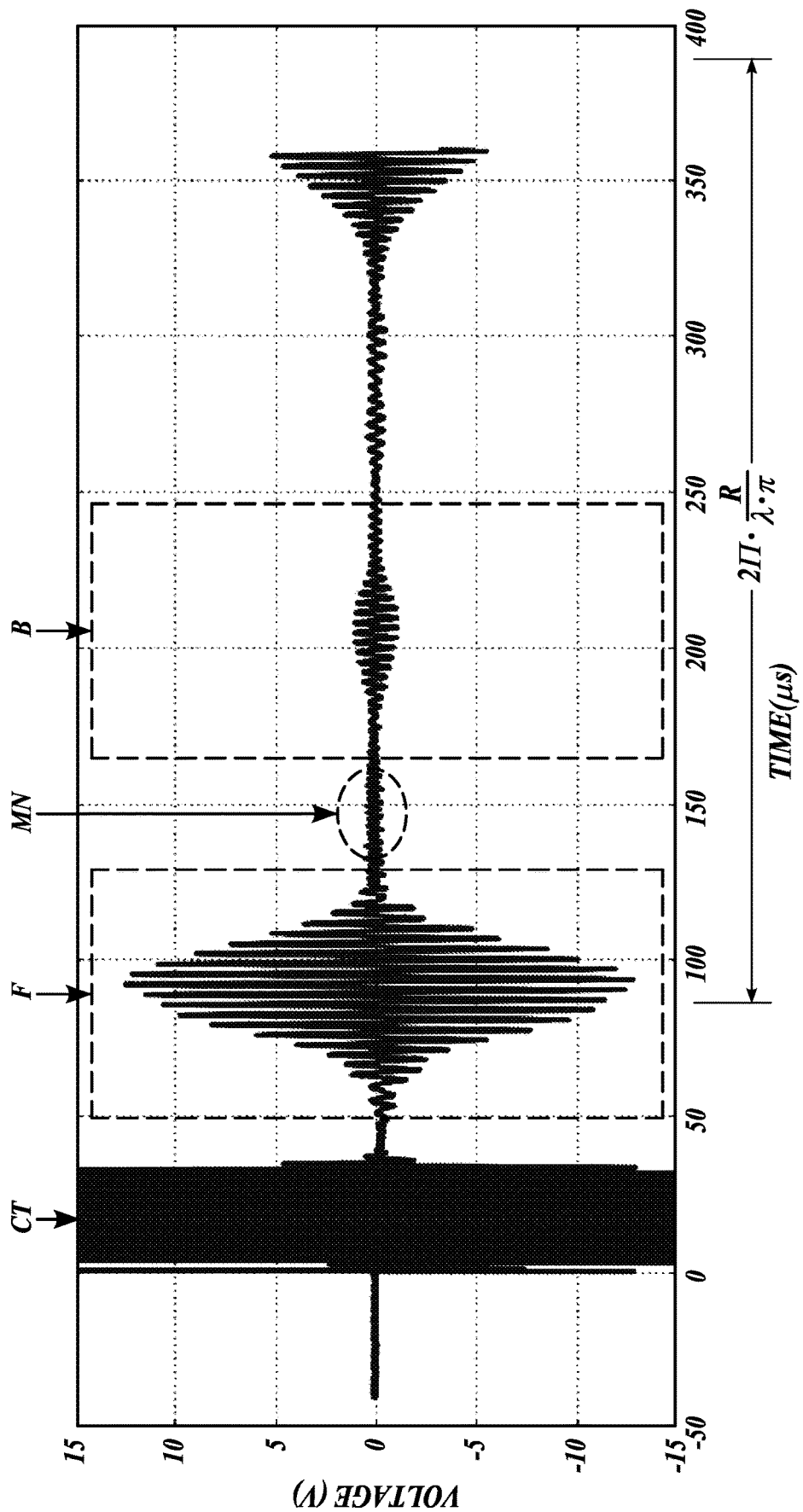
FIGS. 9A-9C are graphs of receiver (RX) signal in accordance with an embodiment of the present technology.
Figure 9B:
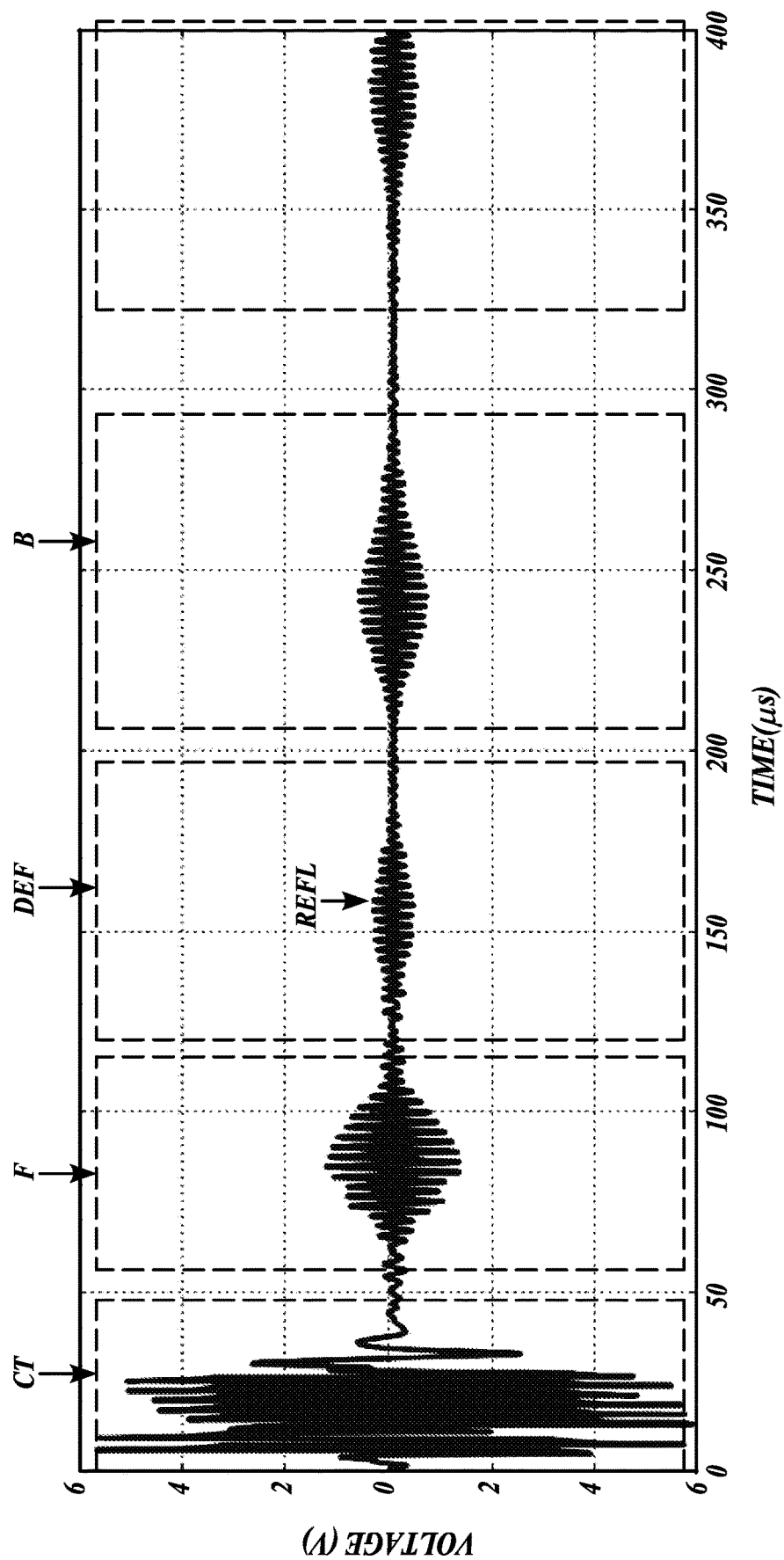
Figure 9C:
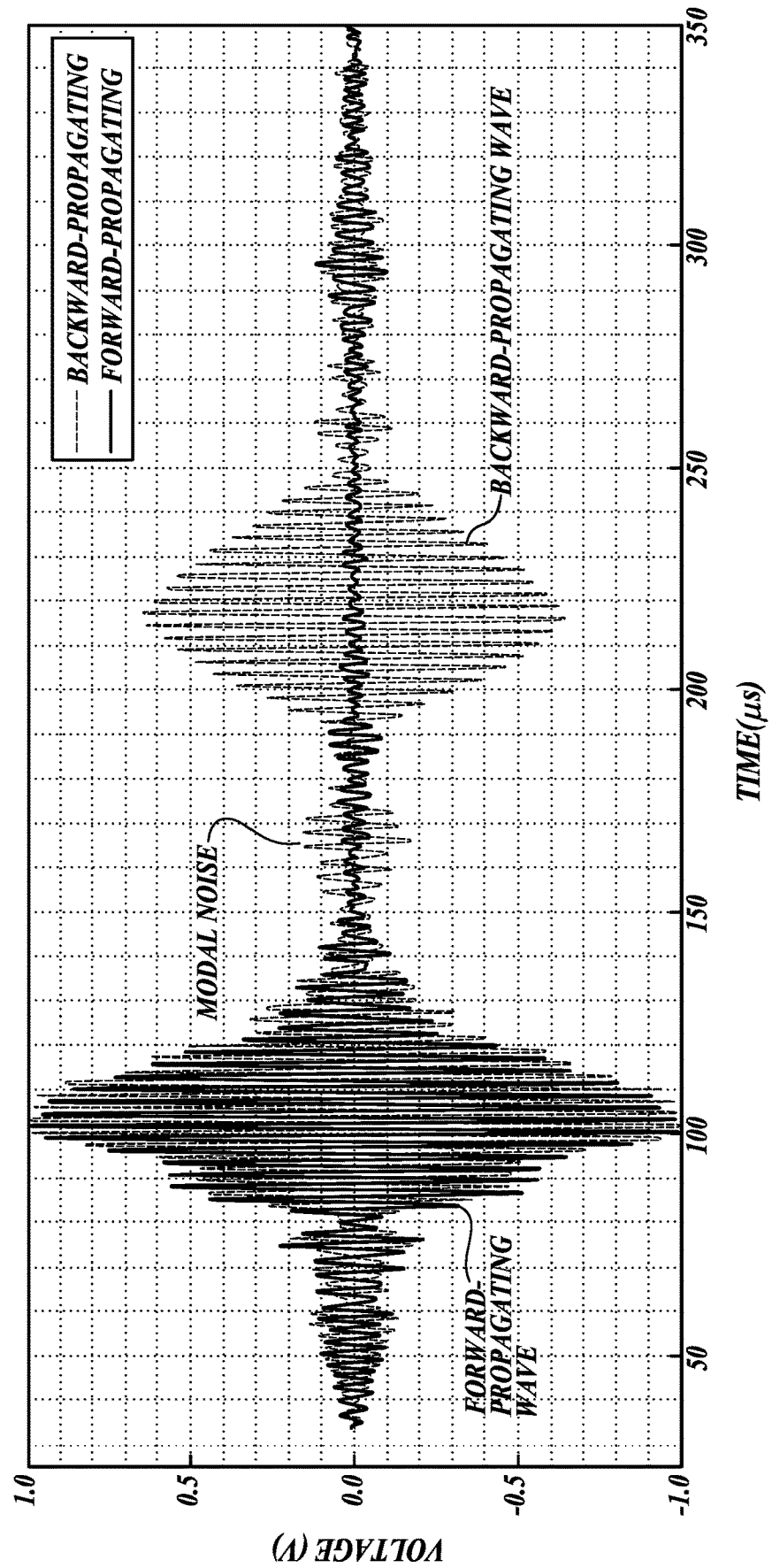

FIGS. 9A-9C are graphs of EMAT RX signal in accordance with an embodiment of the present technology. The horizontal axis in both graphs shows time in μs. For an ultrasound wave with known frequency, a length of time $2\pi R/v_g$ on the horizontal axis corresponds to the time needed for the single to make full circle through the pipe, where R is the radius of the pipe, and $v_g$ is the group velocity of the ultrasonic guided wave mode. In the context of guided waves, $v_g$ generally changes with frequency f. However, when the guided wave mode is characterized by a constant velocity relative to frequency, then the value of $v_g$ is also given by $f\lambda$, where $\lambda$ is the wavelength of the ultrasound wave mode. The vertical axis in both graphs shows signal strength in V as detected by the EMAT RX 130.

The graph in FIG. 9A further illustrates the complexity of the signal obtained from EMAT RX 130 in a pipe. In the illustrated embodiment, the reflected ultrasound waves from the pipe crack are absent (e.g., because no crack exists in a given segment of the pipe). Regions F and B correspond to the forward-propagating and backward-propagating ultrasound signal detected by the EMAT RX. In some embodiments, the amplitude of the forward-propagating signal (region F) is larger than the amplitude of the backward-propagating signal (region B) because the EMAT TX emits a stronger signal in the preferred, forward direction. Region CT corresponds to electrical cross-talk between the TX and RX. For example, driving the coils 210 of the EMAT TX with AC current may electromagnetically couple with the coils 210 of the EMAT RX to produce the signal illustrated in the region CT even in absence of the ultrasound waves at the location of EMAT RX. Furthermore, in some embodiments, the EMAT TX and EMAT RX may share the same power supply, which causes the electromagnetic noise at the EMAT RX when the EMAT TX is excited. Due to the presence of relatively large signals in regions CT, F and B, detecting the ultrasound waves reflected from the crack can be difficult in these regions (also referred to as "blind spot" regions). Furthermore, even outside of the regions CT, F and B, the EMAT RX may be detecting modal noise MN that, if not removed, can be mistakenly interpreted as an indication of the crack in the pipe.

The graph in FIG. 9B shows EMAT RX signal that includes reflected ultrasound waves from the pipe crack. Regions F, B and CT generally represent same types of signals as those described with reference to FIG. 9A. Additionally, the EMAT RX detects a signal REFL corresponding to the ultrasound wave reflected from the crack 5. A region DEF corresponds to the region where such signal may be detectable. In some embodiments, the region(s) DEF is at least partially masked by the regions F, B, and/or CT (and vice versa) thus generally decreasing the sensitivity of the method and, conversely, increasing the blind spots. The reduction of the blind spots therefore increases the sensitivity of the system to the cracks in the pipe. In some embodiments, elimination of the blind spots cannot be fully accomplished by the unidirectional EMAT TX 120 alone.

The graph in FIG. 9C shows EMAT RX signal that does not include reflected ultrasound waves from the pipe crack. The forward-propagating wave is shown in solid line, and the backward-propagating wave is shown in dashed line. In absence of the pipe crack, the region between the strong forward-propagating wave and the strong backward-propagating wave should have relatively small signal amplitude. However, the modal noise increases the signal amplitude in this, otherwise quiet, region. Reduction in the number of modes is explained with reference to FIGS. 10A-11B below.

Figure 10A:
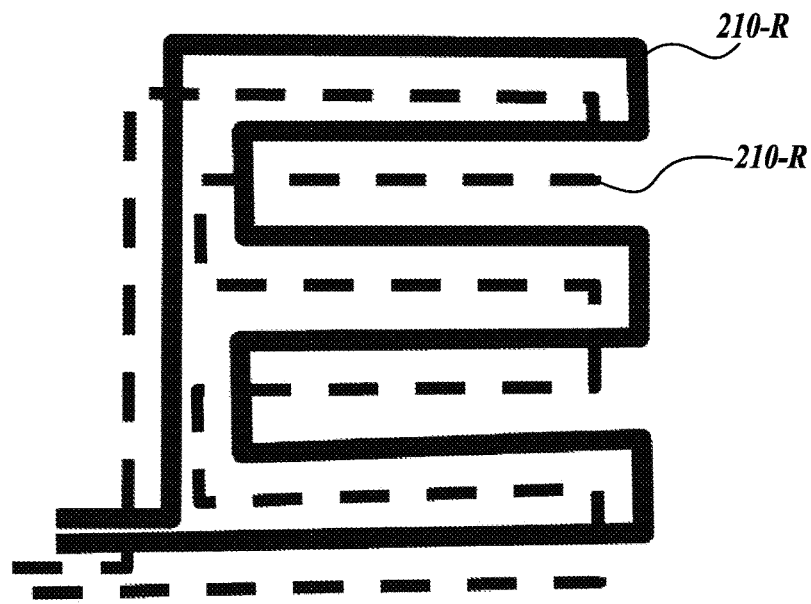
FIG. 10A is a schematic view of coils of RX in accordance with an embodiment of the present technology.

FIG. 10A is a schematic view of coils of EMAT RX in accordance with an embodiment of the present technology. Two coils 210-R are represented by different line types: one coil 210-R is represented by solid line, and the other coil 210-R is represented by dashed line. In operation, the illustrated coils 210-R may be excited such that there is a phase offset from the time when one coil 210-R is excited with AC current to the time when the other coil is excited with AC current. As explained above, the phase-offset excitation may produce ultrasonic waves having stronger amplitude in one direction, and a weaker amplitude in another direction. Additionally, multiple coils 210-R also help in reducing the modal noise MN, as explained with reference to FIG. 10B below.

Figure 10B:
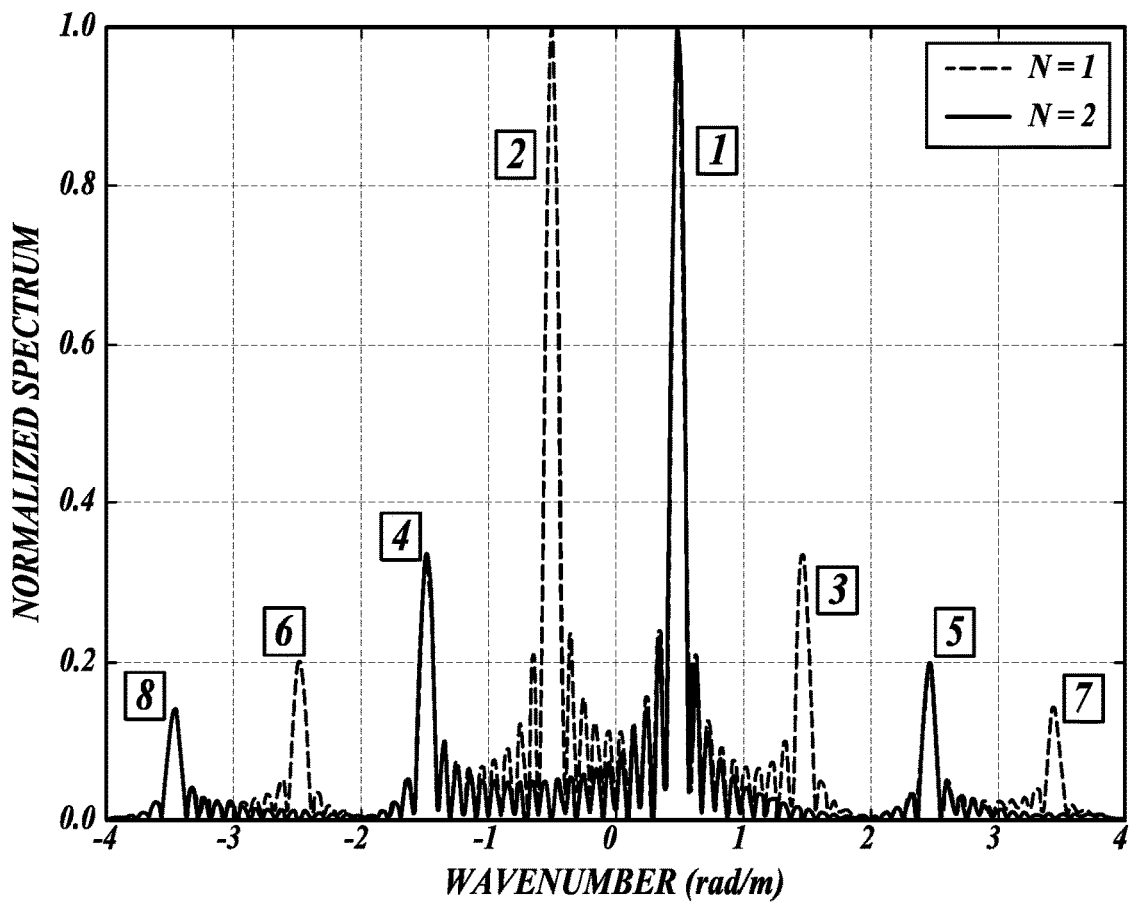
FIG. 10B is a graph of RX signal in accordance with an embodiment of the present technology.

FIG. 10B is a graph of RX signal in accordance with an embodiment of the present technology. The horizontal axis represents the wavenumber of the EMAT RX signal in rad/m. The vertical axis represents normalized spectrum. The peaks in the normalized spectrum represent modes of in the detected RX signal. When the EMAT RX includes only one coil 210-R, the EMAT RX detects all modal peaks 1-8. In at least some embodiments, preferably the EMAT RX detects just one modal peak, the other, unwanted modal peaks representing the modal noise MN. When the EMAT RX includes two coils 210-R, some modal peaks that are part of modal noise MN are eliminated. For example, the modal peaks drawn in dashed lines (modal peaks 2, 4, 6, and 7) are eliminated.

Figure 11A:
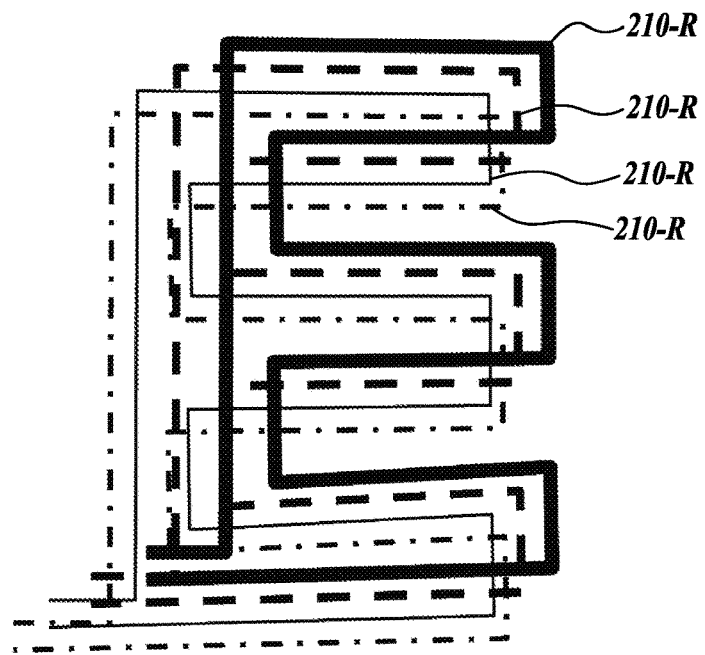
FIG. 11A is a schematic view of coils of RX in accordance with an embodiment of the present technology.

FIG. 11A is a schematic view of coils of EMAT RX in accordance with an embodiment of the present technology. The illustrated EMAT RX includes four coils 210-R represented by different line types. In operation, the illustrated coils 210-R may be excited with a phase offset, resulting in the ultrasonic waves having stronger amplitude in one direction, and a weaker amplitude in another direction. Additionally, an increase in the number of coils 210-R can help to further reduce the modal noise MN, as explained with reference to FIG. 11B below.

Figure 11B:
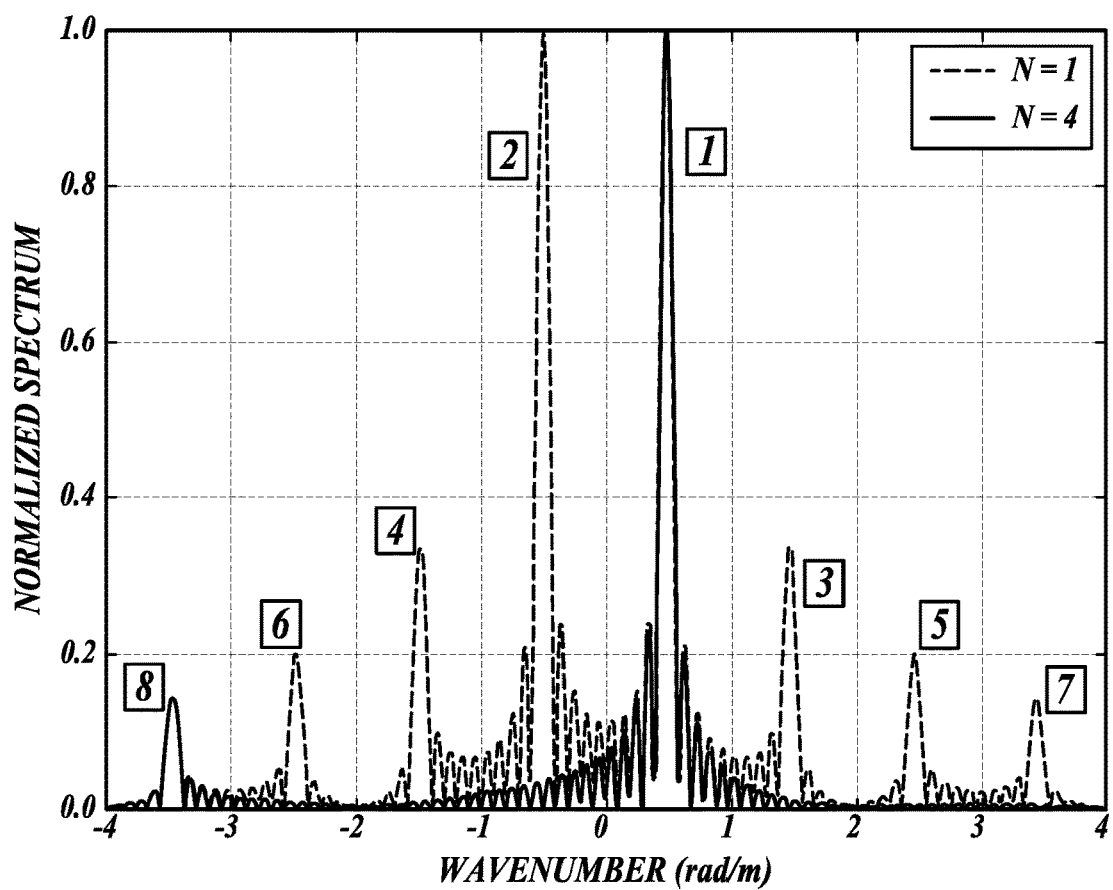
FIG. 11B is a graph of RX signal in accordance with an embodiment of the present technology.

FIG. 11B is a graph of RX signal in accordance with an embodiment of the present technology. The horizontal axis represents the wavenumber of the EMAT RX signal in rad/m. The vertical axis represents normalized spectrum. The peaks in the normalized spectrum represent modes of in the detected RX signal. When the EMAT RX includes only one coil 210-R, modal peaks 1-8 are detected by the EMAT RX, the other modal peaks representing the undesired modal noise MN. When the EMAT RX includes four coils 210-R, some modal peaks that are part of modal noise MN are eliminated. For example, the modal peaks drawn in dashed lines (modal peaks 2, 3, 4, 5, 6, and 7) are eliminated. Analogously, further modal peaks may be eliminated by increasing the number of coils 210-R.

Figure 12:
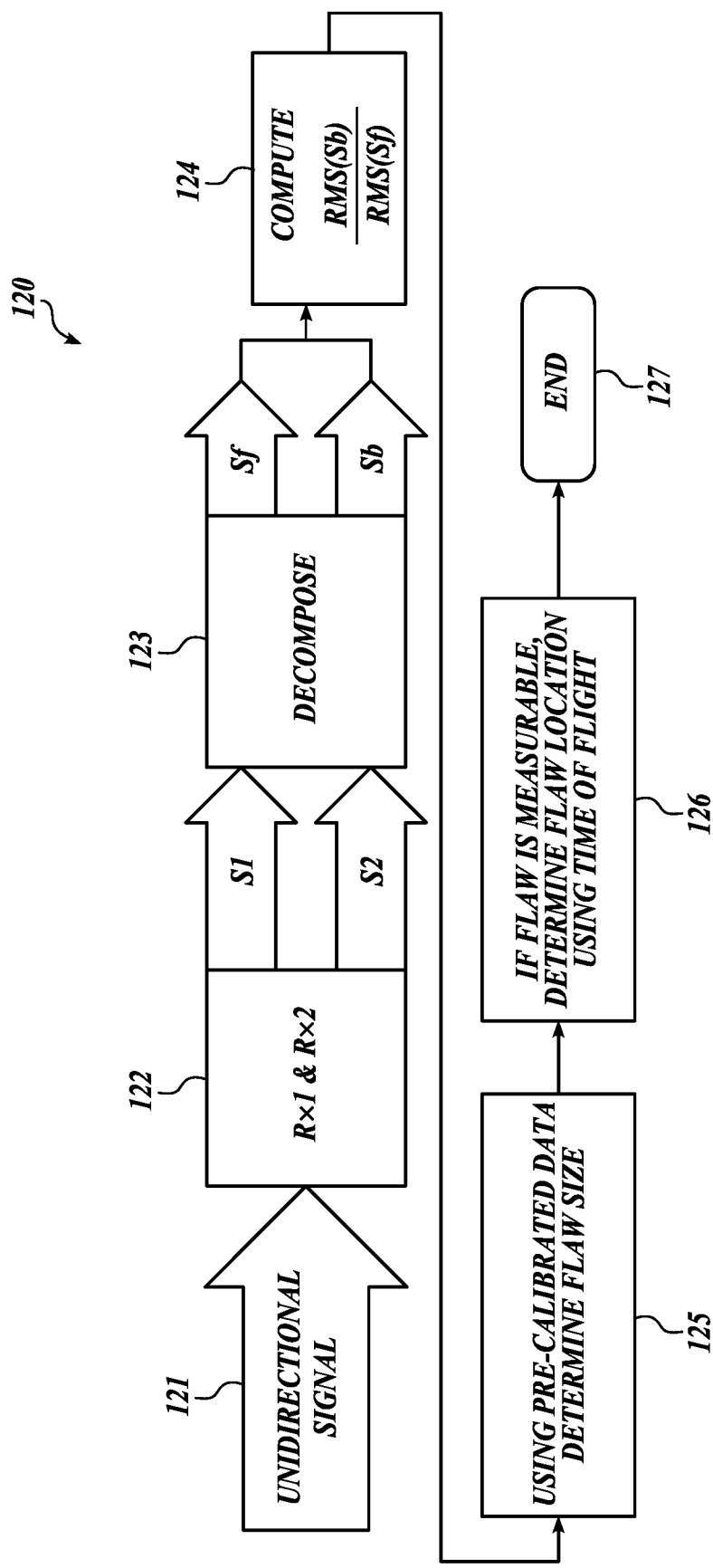
FIGS. 12-14 are flow diagrams of signal processing methods in accordance with embodiments of the present technology.

FIG. 12 is a flow diagram of a signal processing method 120 in accordance with an embodiment of the present technology. In step 121, a unidirectional ultrasonic wave (signal) 121 is transmitted to a multi-channel receiver, for example the EMAT RX 120 having two coils 210 that can be individually measured. In step 122, the individual channels of the multichannel receiver are scanned to produce signal S1 from the first channel (e.g., the first coil) and S2 from the second channel (e.g., the second coil). In other embodiments, different number of signals S can be produced by the EMAT RX, depending on the number of channels (coils) of the EMAT RX. In step 123, the signals S1 and S2 are decomposed into forward-propagating signal Sf and backward-propagating signal Sb relative to the EMAT TRX. The decomposition of the signals S1 and S2 into Sf and Sb is explained with reference to FIG. 14 below.

In step 124, the RMS-es for the forward-propagating signal Sf and backward-propagating signal Sb are calculated, and the ratio of the RMS-es is calculated to as a measure of side-band suppression. For example, in some embodiments the modal peaks on the negative wavenumber axis (also referred to as the "sidebands") can be suppressed using a dual coil (i.e., dual channel) EMAT TX 130. In general, the term "improvement of sideband suppression" refers to a decrease of the sidebands. The term "degradation of sideband suppression" refers to an increase of the sidebands. In some embodiments, if there are no flaws (e.g., cracks) in the pipe, the side-band suppression remains the same. If, however, a flaw exists, then the reflected ultrasonic wave may cause an apparent degradation in the sideband suppression. In step 125, the change in the apparent sideband suppression efficiency can be compared with pre-calibrated lookup table to obtain the flaw size. If the flaw size is directly measureable, then it may also be locatable. In step 126, to locate the flaw, a peak of Sb and its time of arrival, Tb is found. Multiplying Tb with the group velocity for the ultrasound provides the location of the flaw.

In at least some embodiments, the method 120 works well even in the presence of seams and uniform corrosion in the inside of the pipe, when larger lengths of data (higher than 720° of wave traversal) are used. Generally, the sideband suppression converges to uniform values in the presence of flaws, if larger data lengths are used.

Figure 13:
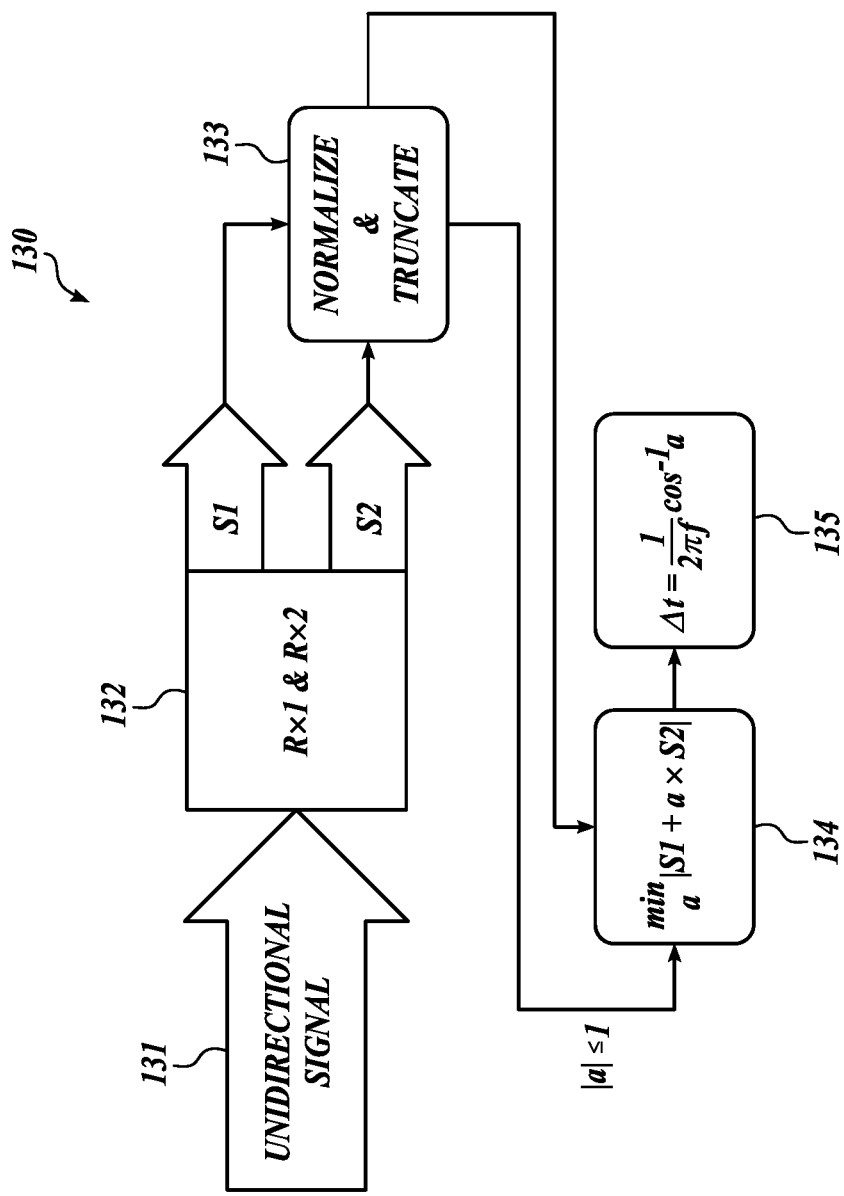

FIG. 13 is a flow diagram of a signal processing method 130 in accordance with an embodiment of the present technology. The method 130 can find a time delay between the two signals, for example the signals received by the individual coils of the multichannel EMAT RX. In step 131, a unidirectional ultrasonic wave (signal) 121 is transmitted to a multi-channel receiver, for example the EMAT RX 120 having two coils 210. In step 122, the individual channels of the multichannel receiver are scanned to produce signal S1 from the first channel (e.g., first coil) and S2 from the second channel (e.g., second coil). In step 133, data S1 and S2 from the two channels of the EMAT RX are normalized so that they have equal amplitude. In some embodiments, in step 134 the following minimization problem is solved:

$$\min_{a} |S1 + a \times S2|, \text{ such that } |a| \le 1 \qquad \text{(Eq. 1)}$$

The solution of Equation 1 can be interpreted as: find the value of a for the minimum possible norm (root mean square) of the quantity S1+a×S2 (after normalizing signals S1 and S2 as in, for example, step 133). Once the value of a is found, the time delay between the signals received by the individual coils of the multichannel EMAT RX can be calculated in step 135 using the formula:

$$\Delta t = \frac{1}{2\pi f} \cos^{-1} a \quad \text{(Eq. 2)}$$

where $f$ is the center frequency of the input signal. In some embodiments, the implementation of Eq. 2 results in sideband suppression of 2-4 dB.

In some embodiments, instead of Eq. 1, an average of $_a^{min}|a \times S1+S2|$ and $_a^{min}|S1+a \times S2|$ can provide improved sideband suppression. The method 130 may be generalized to a multi-channel EMAT having more than two channels by, for example, applying the algorithms in Eqs. 1 and 2 to data from two channels at a time, while keeping a common EMAT RX channel for each pair to assure that the time delays will be relative to such a common channel. The method 130 can also be implemented on the transmit side (e.g., with EMAT TX having multiple channels).

Figure 14:
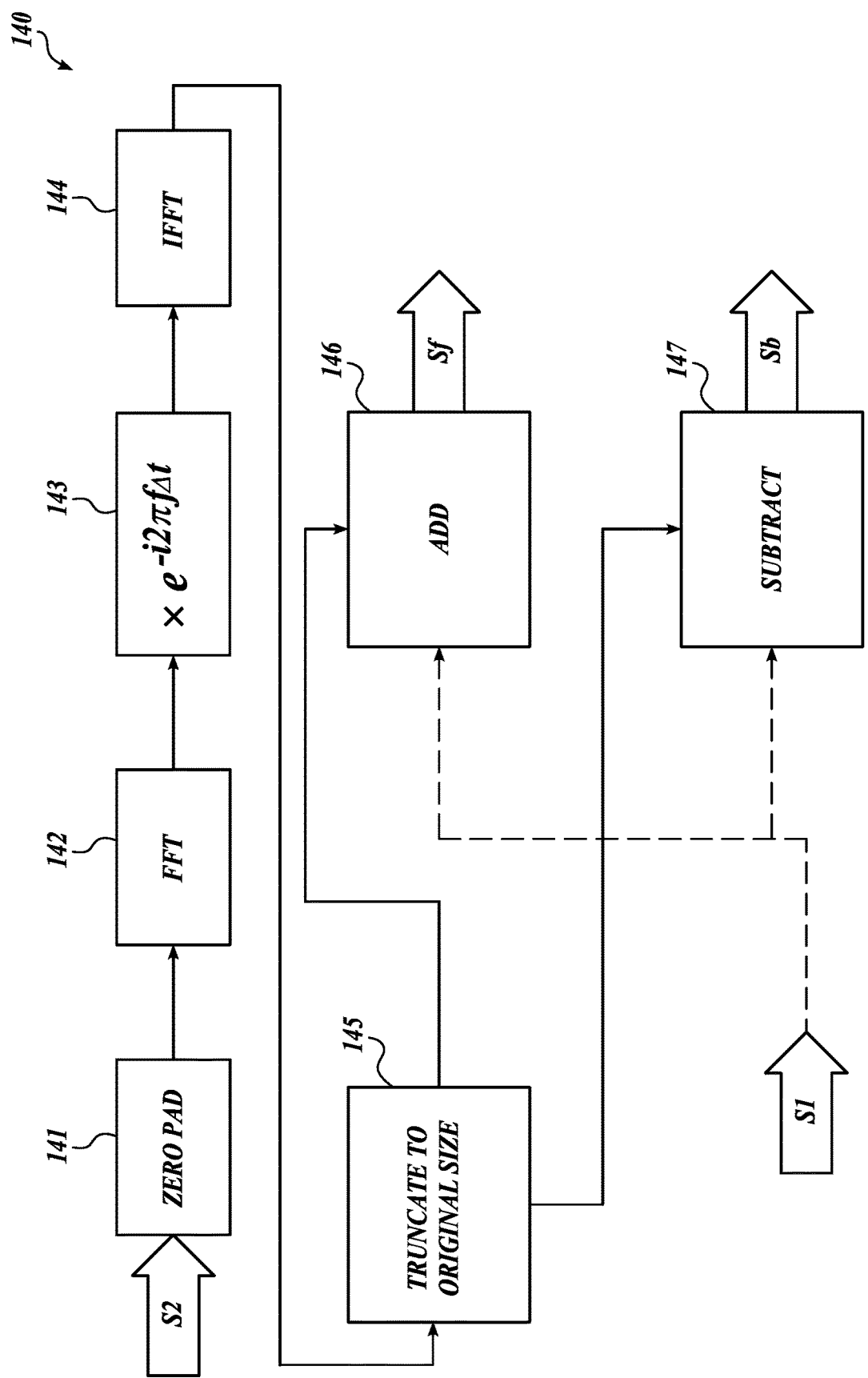

FIG. 14 is a flow diagram of a signal processing method 140 in accordance with an embodiment of the present technology. In some embodiments, the method 140 may eliminate or at least reduce a need for the RX electronics (e.g., analog to digital converter) with high sampling frequency, while achieving high sideband suppression. The signals S1 and S2 may be obtained using, for example, methods described with reference to FIGS. 12 and 13. With the method 140, time delays are applied to signal S2.

In step 141, zero padding is applied to signal S2. In some embodiments, the number of zero data may depend on capacity of the onboard memory. In step 142, a fast Fourier transform (FFT) of the zero-padded signal is determined. In step 143, the FFT results from step 142 are multiplied by a vector $e^{-i2\pi f \Delta t}$ to obtain vector $\hat{S}2$), where $f$ is a vector of frequencies whose values and range depend on the original sampling frequency of S2 and the size of the zero-padded version of S2. In step 144, an inverse FFT (IFFT) is performed over the $\hat{S}2$. In step 145, the results of step 144 are truncated such that the length of the data (e.g., the length of the time series) is back to the original length of S2. The resulting S2 is an accurate time delayed version of the acquired S2. In some embodiments, the accuracy of the time delay is proportional to the length of the zero-padding. In step 146, this resulting S2 from step 145 may be added to S1 to determine a forward-propagating wave Sf. Analogously, in step 147 the resulting S2 from step 145 may be subtracted from S1 to determine a backward-propagating wave Sb. In some embodiments, if the original sampling frequency is much larger than the frequency of interest, this algorithm need not be followed. Instead, the delay can be obtained by truncating the end of the signal and adding zeros at the beginning of the signal.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

The embodiments of the invention in which an exclusive property or privilege is claimed are defined as follows:

1. A method of detecting a flaw in a circumference of a pipe, the method comprising:
    transmitting, by a multichannel EMAT transmitter (TX), unidirectional waves in the pipe; wherein transmitted ultrasound unidirectional waves comprise a forward-propagating component and a backward-propagating component, wherein the transmitted forward-propagating component is larger than the transmitted backward-propagating component;
    receiving, by a multichannel EMAT receiver (RX), the unidirectional waves transmitted by the EMAT TX;
    decomposing the unidirectional waves received by the EMAT RX into a forward-propagating component and a backward-propagating component; and
    detecting the flaw in the circumference of the pipe based on decomposing the ultrasound waves received by the EMAT RX.

2. The method of claim 1, further comprising determining a size of the flaw.

3. The method of claim 2, wherein detecting the flaw in the circumference of the pipe comprises evaluating a ratio of strength of the forward-propagating component and strength of the backward-propagating component.

4. The method of claim 3, wherein the detecting and sizing the flaw in the circumference of the pipe comprises simultaneously detecting and sizing the flaw in the circumference of the pipe based on the ratio of the strength of the forward-propagating component and the strength of the backward-propagating component.

5. The method of claim 1, further comprising:
    determining a time delay $\Delta t$ between signals S1 and S2 received by individual coils of the EMAT RX by finding a value "a" that satisfies:

$$\min_{a} |S1 + a \times S2|$$

such that $|a| \leq 1$; and
determining the $\Delta t$ as:

$$\Delta t = \frac{1}{2\pi f} \cos^{-1} a$$

where $f$ is a frequency of the unidirectional waves.

6. The method of claim 5, further comprising using Fast Fourier Transform (FFT) to at least in part determine a time delayed signal S2.

7. The method of claim 5, further comprising summing S1 and S2 to determine the forward-propagating component.

8. The method of claim 5, further comprising subtracting S2 from S1 to determine the backward-propagating component.

9. The method of claim 1, further comprising:
reducing a modal noise by delaying and then adding or subtracting signals received by the EMAT receiver to yield a pair of signals representing forward-propagating and backward-propagating waves, wherein the pair of signals have lower modal noise compared to the signals received by the plurality of multilayered coils of the EMAT receiver.

10. The method of claim 9, further comprising:
determining a ratio of RMS-es of the forward-propagating waves and backward-propagating waves, the ratio of the RMS-es represents a measure of a side-band suppression.

11. The method of claim 10, further comprising:
comparing the side-band suppression with pre-calibrated lookup table to obtain a size and a location of the flaw.

12. The method of claim 6, wherein the EMAT RX and the EMAT TX each comprises at least two coils.

13. The method of claim 1, wherein the transmitted forward-propagating component is at least four times larger than the transmitted backward-propagating component.

* * * * *